US010861268B2

(12) United States Patent
Worrall et al.

(10) Patent No.: US 10,861,268 B2
(45) Date of Patent: *Dec. 8, 2020

(54) PORTABLE ACCESS CONTROL

(71) Applicant: Palantir Technologies Inc., Palo Alto, CA (US)

(72) Inventors: Jeffrey Worrall, Pleasanton, CA (US); Joel Hosino, Sunnyvale, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,993

(22) Filed: Oct. 7, 2019

(65) Prior Publication Data

US 2020/0090432 A1 Mar. 19, 2020

Related U.S. Application Data

(63) Continuation of application No. 16/109,431, filed on Aug. 22, 2018, now Pat. No. 10,482,693, which is a continuation of application No. 15/703,499, filed on Sep. 13, 2017, now Pat. No. 10,140,792, which is a continuation of application No. 15/050,305, filed on Feb. 22, 2016, now Pat. No. 9,799,153.

(60) Provisional application No. 62/267,188, filed on Dec. 14, 2015.

(51) Int. Cl.
*G05B 19/00* (2006.01)
*G07C 9/22* (2020.01)

(52) U.S. Cl.
CPC .................................... *G07C 9/22* (2020.01)

(58) Field of Classification Search
None
See application file for complete search history.

(56) References Cited

U.S. PATENT DOCUMENTS

| | | | |
|---|---|---|---|
| 5,936,544 | A | 8/1999 | Gonzales et al. |
| 6,377,955 | B1 | 4/2002 | Hartmann et al. |
| 6,799,031 | B1 | 9/2004 | Lewiner Jacques et al. |
| 7,581,011 | B2 | 8/2009 | Teng |
| 9,799,153 | B1 | 10/2017 | Worrall et al. |
| 10,140,792 | B1 | 11/2018 | Worrall et al. |
| 10,482,693 | B2 | 11/2019 | Worrall et al. |

(Continued)

FOREIGN PATENT DOCUMENTS

| | | | |
|---|---|---|---|
| EP | 2866208 | A1 | 4/2015 |
| WO | WO-2008090262 | A1 | 7/2008 |
| WO | WO-2009123975 | A1 | 10/2009 |

OTHER PUBLICATIONS

"U.S. Appl. No. 14/149,387, First Action Interview Pre-Interview Communication dated Mar. 24, 2016", 6 pgs.

(Continued)

*Primary Examiner* — Adolf Dsouza

(74) *Attorney, Agent, or Firm* — Schwegman Lundberg & Woessner, P.A.

(57) ABSTRACT

Aspects of the present disclosure relate to a device is configured to store a list of user identifiers and user attribute data, receive a set of access criteria specifying one or more attributes, receive and identify a user identifier via a data input component, determine an access status of the user identifier based on the access criteria, and present the access status in such a way as is perceivable by a user of the access control device.

20 Claims, 6 Drawing Sheets

(56) References Cited

U.S. PATENT DOCUMENTS

| | | | |
|---|---|---|---|
| 2004/0153418 A1 | 8/2004 | Hanweck | |
| 2004/0160309 A1 | 8/2004 | Stilp | |
| 2006/0109114 A1 | 5/2006 | Watts et al. | |
| 2007/0083921 A1 | 4/2007 | Parris et al. | |
| 2008/0169922 A1 | 7/2008 | Issokson | |
| 2008/0316024 A1 | 12/2008 | Chantelou et al. | |
| 2011/0069145 A1 | 3/2011 | Weber et al. | |
| 2012/0056722 A1 | 3/2012 | Kawaguchi | |
| 2015/0199533 A1* | 7/2015 | Chou Fritz ......... | G06F 21/6218 707/785 |
| 2018/0365916 A1 | 12/2018 | Worrall et al. | |

OTHER PUBLICATIONS

"U.S. Appl. No. 14/490,612, Examiner Interview Summary dated Mar. 31, 2015", 7 pgs.

"U.S. Appl. No. 14/490,612, First Action Interview Pre-Interview Communication dated Jan. 27, 2015", 16 pgs.

"U.S. Appl. No. 15/050,305, Non Final Office Action dated Dec. 30, 2016", 14 pgs.

"U.S. Appl. No. 15/050,305, Notice of Allowance dated Jun. 15, 2017", 10 pgs.

"U.S. Appl. No. 15/050,305, Response Filed Mar. 7, 2017 to Non Final Office Action dated Dec. 30, 2016", 13 pgs.

"U.S. Appl. No. 15/703,499, Non Final Office Action dated Feb. 8, 2018", 16 pgs.

"U.S. Appl. No. 15/703,499, Notice of Allowance dated Jul. 31, 2018", 8 pgs.

"U.S. Appl. No. 15/703,499, Response filed Apr. 9, 2018 to Non Final Office Action dated Feb. 8, 2018", 11 pgs.

"U.S. Appl. No. 16/109,431, Non Final Office Action dated May 31, 2019", 15 pgs.

"U.S. Appl. No. 16/109,431, Notice of Allowance dated Jul. 12, 2019", 8 pgs.

"U.S. Appl. No. 16/109,431, Response filed Jun. 25, 2019 to Non-Final Office Action dated May 31, 2019", 12 pgs.

"Australian Application Serial No. 2014253531, Office Action dated Jun. 4, 2015", 3 pgs.

"European Application Serial No. 14190197.5, Extended European Search Report dated Mar. 27, 2015", 9 pgs.

"European Application Serial No. 14190197.5, Non Final Office Action dated May 23, 2016", 10 pgs.

Glaab, Enrico, et al., "EnrichNet: network-based gene set enrichment analysis", Bioinformatics 28.18, (2012), i451-i457.

Hur, Junguk, et al., "SciMiner: web-based literature mining tool for target identification and functional enrichment analysis", Bioinformatics 25.6, (2009), 838-840.

Zheng, Qi, et al., "GOEAST: a web-based software toolkit for Gene Ontology enrichment analysis", Nucleic Acids Research, 2008, vol. 36, Web Server issue, (May 16, 2008), W358-W63.

U.S. Appl. No. 15/050,305, U.S. Pat. No. 9,799,153, filed Feb. 22, 2016, Portable Access Control.

U.S. Appl. No. 15/703,499, U.S. Pat. No. 10,140,792, filed Sep. 13, 2017, Portable Access Control.

U.S. Appl. No. 16/109,431, U.S. Pat. No. 10,482,693, filed Aug. 22, 2018, Portable Access Control.

* cited by examiner

500

502

| USER IDENTIFIER | USER ATTRIBUTES | | | |
|---|---|---|---|---|
| | NAME | TEAM | EMPLOYMENT STATUS | SECURITY CLEARANCE |
| USER ID_1 | Richards | Team 1 | Temp. | High |
| USER ID_2 | Killian | Team 2 | Manager | Low |
| USER ID_3 | Mendez | Team 1 | Temp. | High |

502 504 506 508

FIG. 5

PORTABLE ACCESS CONTROL

RELATED APPLICATIONS

This application is a continuation of, and claims the benefit of U.S. patent application Ser. No. 16/109,431, filed Aug. 22, 2018, which is a continuation of, and claims the benefit of U.S. patent application Ser. No. 15/703,499, filed Sep. 13, 2017, which is a continuation of, and claims the priority of U.S. patent application Ser. No. 15/050,305, filed Feb. 22, 2016, which claims the priority benefit of U.S. Provisional Application No. 62/267,188, filed Dec. 14, 2015, which are incorporated by reference herein in their entireties.

TECHNICAL FIELD

The subject matter disclosed herein relates to access control and authentication. In particular, example embodiments may relate to a portable access control device.

BACKGROUND

Access control systems restrict entrance to a building, or individual rooms within that building, to authorized personnel. For example, an access control system determines who is allowed to enter or exit a premises based on a wide range of authentication credentials. Conventionally, access control systems decisions are made by comparing a user credential received through a keypad or card reader to an access control list existing within a server at a remote location, via a network. However this poses a problem in instances where a network may be unavailable, for example if the network is down, or alternatively, if a building does not have network connectivity at all.

BRIEF DESCRIPTION OF THE DRAWINGS

Various ones of the appended drawings merely illustrate example embodiments of the present inventive subject matter and cannot be considered as limiting its scope.

FIG. 5 is a representation of a data-table containing user data, the user data including user identifiers and user attributes, according to some embodiments.

DETAILED DESCRIPTION

Figure 1:
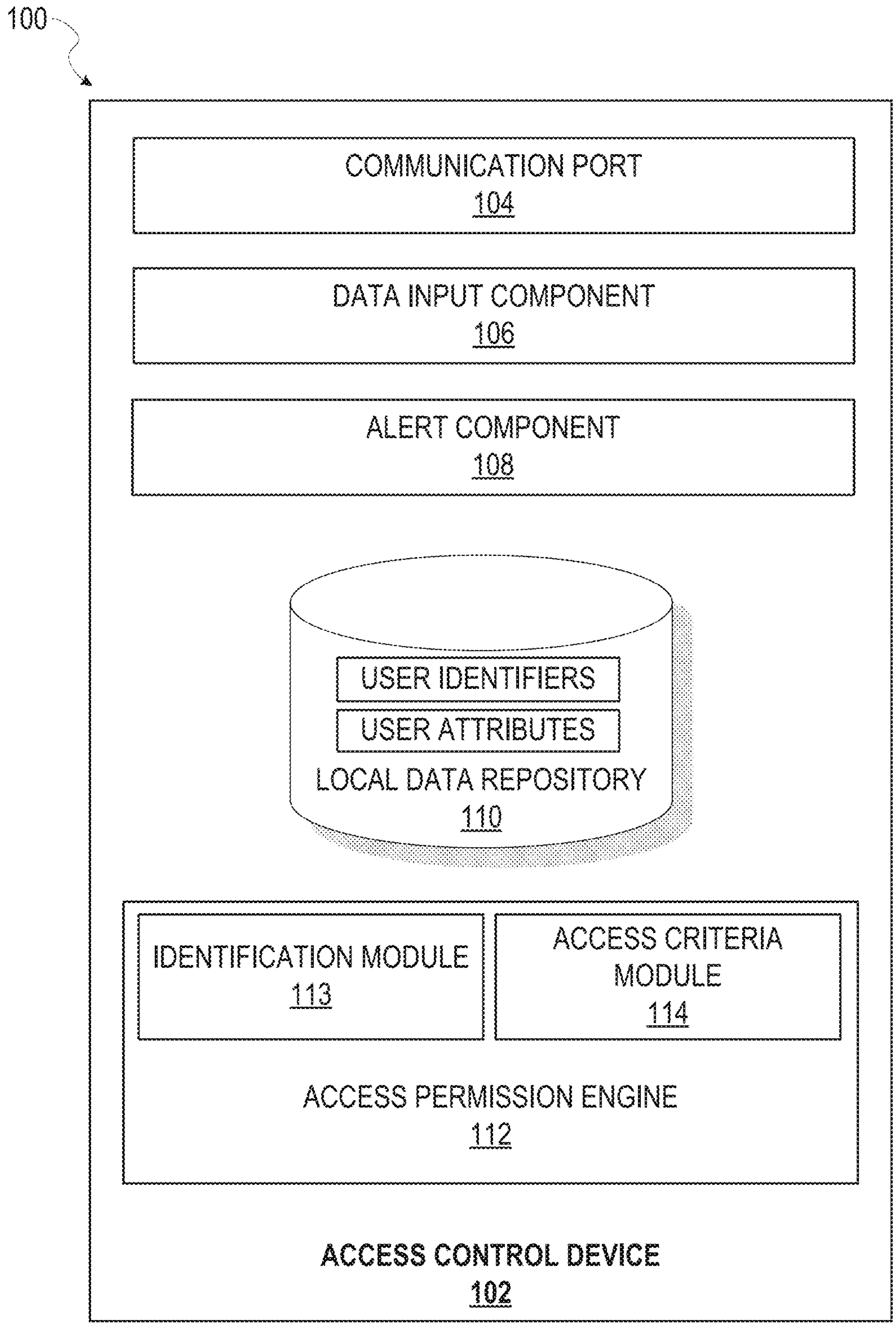
FIG. 1 is an architecture diagram depicting a portable access control device configured for providing access control functionality, according to an example embodiment.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Aspects of the present disclosure relate to a portable access control device configured to store a list of user identifiers and user attribute data, receive a set of access criteria specifying one or more attributes, receive and identify a user identifier via a data input component, determine an access status of the user identifier based on the access criteria, and present the access status in such a way as is perceivable by a user of the access control device. The access control device may include one or more processors, data input components, and notification components. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The user attribute data stored by the portable access control device may include security clearance information, employment information, names, titles, user information, project identifiers, and group identifiers, associated with user identifiers of users. The portable access control device is configured to store the user identifiers and user attribute data within a local memory store integrated within the portable access control device.

The portable access control device is additionally configured to receive sets of access criteria to define possible access statuses associated with user identifiers among the list of user identifiers. In some embodiments, the portable access control device provides an interface to receive access status definitions. An access status may be defined based on user attributes. User attributes include employee type (e.g., full-time, part-time, contractor), team/department (e.g., IT team access, accounting team access, engineering team access), employment status (e.g., active, inactive). Access statuses may include approval and denial of access, as well as conditional or temporally limited access statuses In some embodiments, the portable access control device receives power and data via a power over Ethernet (PoE) port. PoE includes any of several standardized systems which pass electrical power along with data on Ethernet cabling.

According to various example embodiments, the portable access control device includes a data input component to receive user identifiers. The data input component may include a card reader (e.g., a magnetic stripe reader, a bar code reader, a proximity reader, a smart card reader, or a biometric reader), or simply a keypad to receive user identification data. As an example, a user may provide a user identifier (e.g., a user ID, a name, a PIN) to the data input component via a card or similar identification medium, or as a user input. Responsive to receiving the user identifier from the data input component, the portable access control device determines an access status of the user associated with the user identifier based on access criteria indicated by the selections of one or more user attributes.

Responsive to determining an access status associated with a user identifier, the portable access control device is configured to present the access status as an access alert. The access alert may include auditory alerts (e.g., a tone), visual alerts (e.g., a light emitting diode (LED) or similar visual indicator), haptic alerts (e.g., vibrate), as well as by transmitting an indication of the access status to a client device via an integrated transmitter (e.g., Bluetooth). For example, the portable access control device may indicate an approved access status by illuminating a first LED, and a denied access status by illuminating a second LED.

In some embodiments, the portable access control device identifies and stores a time and date indicating receipt of a user identifier. For example, responsive to receiving a user identifier via the data input component, the portable access control system may store the time and date that the user identifier was received, and store the time and date within the local memory at a memory location linked to the user identifier. In some embodiments, the portable access control device is configured to upload the contents of the local memory to a network via a wired connection, and may generate a report of all user identifiers received over a period of time. The report may include a list of user identifiers, along with time stamps, user names, access status (e.g., granted, denied), as well as the specific location of the portable access control device.

FIG. 1 is an architecture diagram 100 depicting an access control device 102, according to an example embodiment. The access control device 102 shown in FIG. 1 includes a communication port 104, a data input component 106, an alert component 108, local data repository 110, and access permission engine 112, all configured to communicate with each other (e.g., via bus, shared memory, or a switch). Components of the elements of the access control device 102 may be implemented using one or more processors, and hence may be configured by such one or more processors to perform functions described for that element.

Any one or more of the elements described may be implemented using hardware alone, or a combination of hardware and software. For example, a number of components described of the access control device 102 may physically include an arrangement of one or more processors configured to perform the operations described herein. Moreover, any two or more of the elements of the access control device may be combined into a single element, or subdivided into multiple elements.

As shown, the access control device 102 includes a communication port 104 to receive user data including a list of user identifiers and user attributes, and store the user data within a local data repository 110. In some embodiments, the communication port 104 is a Power over Ethernet (PoE) port, which passes electrical power along with data on Ethernet cabling. In this way, the access control device 102 may receive power as well as data via a single connection. In some embodiments, the communication port 104 may include wireless communication components, such as a Bluetooth transceiver.

The local data repository 110 stores the user identifiers and user attributes within a data-table. In some embodiments, the local data repository 110 maintains the user attribute data within a data-table indexed according to user identifier.

The access control device 102 is also shown to include a data input component 106 to receive a user identification data. The data input component may include a magnetic strip reader, a bar code reader, a proximity reader, a smart card reader, a biometric reader, or a keypad. The access control device 102 also includes an alert component 108 to provide a notification indicating an access status. The alert component 108 may include a series of light emitting diodes (LEDs), speakers, digital displays, transmitting components, or other components configured to cause display of an alert or notification.

The access control device 102 includes an access permission engine 110, configured to receive access criteria to define requirements of possible access statuses. The access permission engine 112 comprises an identification module 113 to receive user identifiers from the data input component and retrieve associated user attributes (e.g., from the local data repository 110), and an access criteria module 114 to determine an access status of the user identifier based on a comparison of the associated user attributes and the access criteria.

Figure 2:
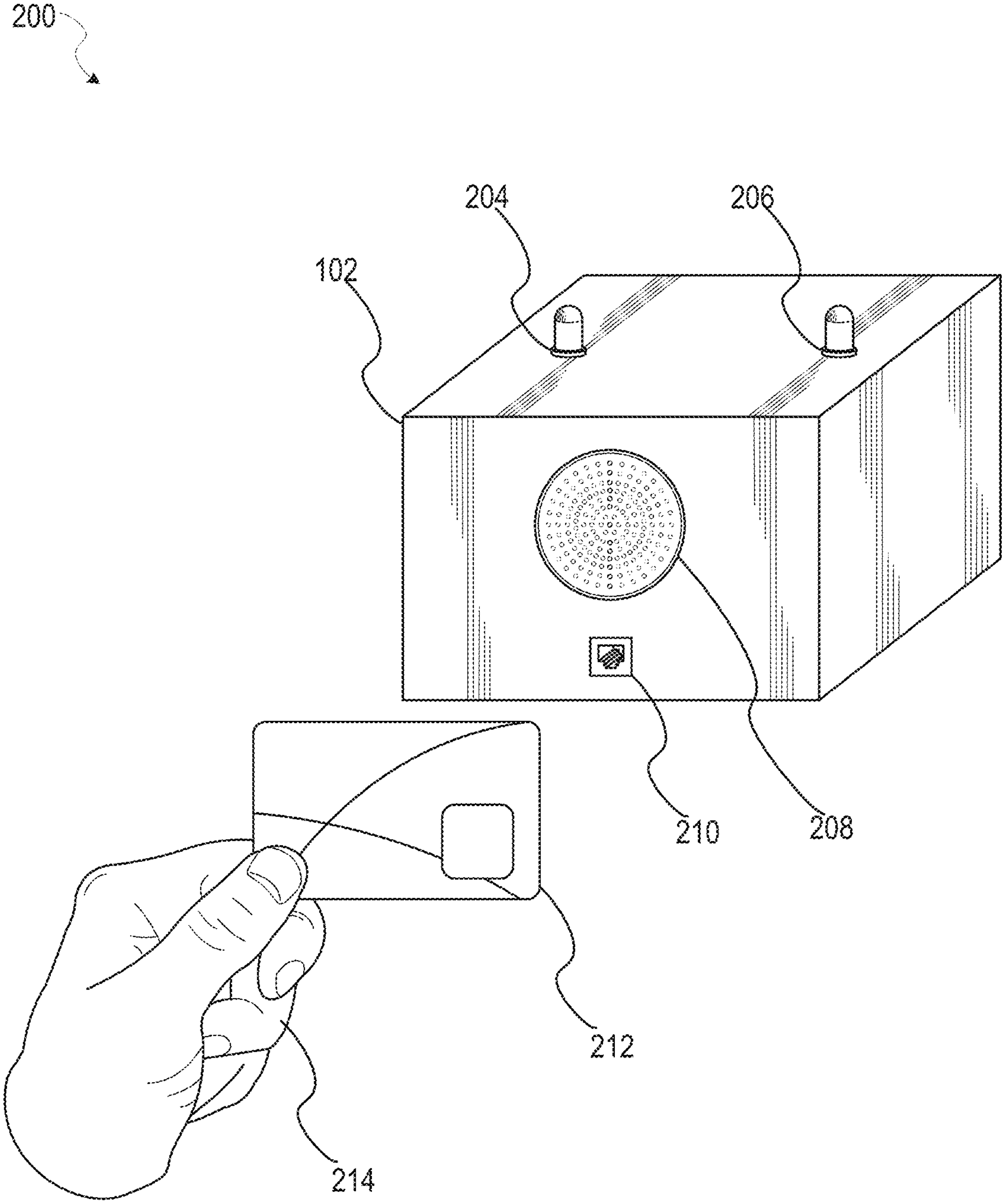
FIG. 2 is a diagram illustrating a portable access control device, depicting a user interaction with the portable access control device, consistent with some embodiments.

FIG. 2 is a diagram 200 illustrating an access control device 102, including alert components 204, 206, and 208 (e.g., alert component 108), and a PoE port 210. The illustration 200 depicts a user 214 interacting with the access control device 102 via an identification medium 212 (e.g., an RFID card).

The access control device 102 is shown to include LEDs 204 and 206, and a speaker 208. Responsive to the identification medium 212 being placed in proximity to access control device 102, the access control device 102 transmits a signal to identification medium 212 which in turn causes identification medium 212 to transmit identification data (e.g., a user ID) to the access control device 102. Responsive to receiving the identification data, the access control device 102 determines an access status associated with the identification data, and causes an indication of the access status. For example, the access control device 102 causes LED 204 to illuminate in response to determining that the user identifier is approved for access, or causes LED 206 to illuminate responsive to determining that the user identifier is denied access. The access control device 102 emits tones, or notification via the speaker 208 to indicate the determined access status.

The PoE port 210 of the access control device 102 provides both data and power connections in one cable, such that the access control device 102 does not require a separate cable for each need.

Figure 3:
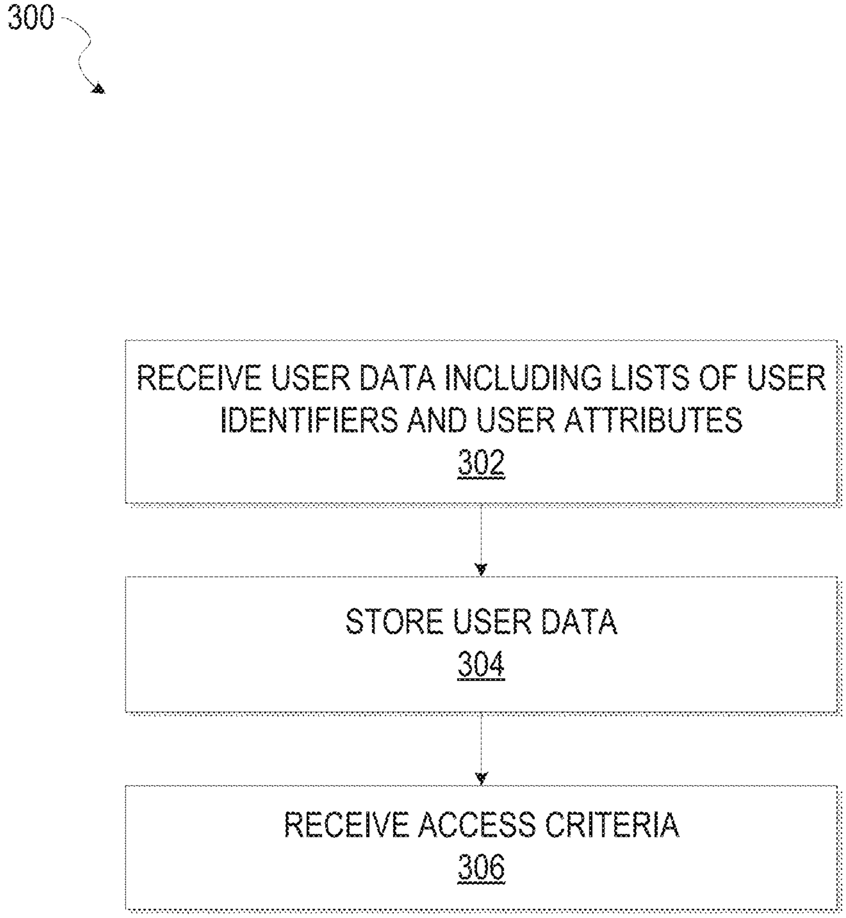
FIG. 3 is a flowchart illustrating a method for determining an access status based on a comparison of a user identifier against access criteria, according to some embodiments.

FIG. 3 is a flowchart illustrating operations of a method 300 for receiving user data including lists of user identifiers and user attributes, and defining access criteria, according to some embodiments.

In operation 302, user data including a list of user identifiers and user attribute data are received by the access control device 102. The user data may be uploaded into the memory via communication port 104, as illustrated in FIG. 2. The user data may include user identifiers (e.g., lists of names and user identification numbers) as well as user attributes (e.g., user information, employment information, title, project identifiers, etc.). At operation 304, the access control device 102 stores the user data in a database (e.g., local data repository 110), as can be seen in FIG. 5.

In operation 306, the access permission engine 112 receives access criteria to define an access status via the communication port 104. The access criteria may include one or more user attributes (e.g., from among the user attribute data), as well as selections of individual user identifiers. For example, access criteria may include selections of specific user identifiers associated with users, as well as an employment status indicated by a user profile associated with the user identifier. In some embodiments, the access permission engine 112 may generate and present a graphical user interface configured to receive access criteria and based on user inputs, assign the access criteria to an access status. For example, a user of the graphical user interface may identify a set of user attributes to receive an approved access status, or alternatively, may identify specific user identifiers, or user attributes to receive a denied access status.

Figure 4:
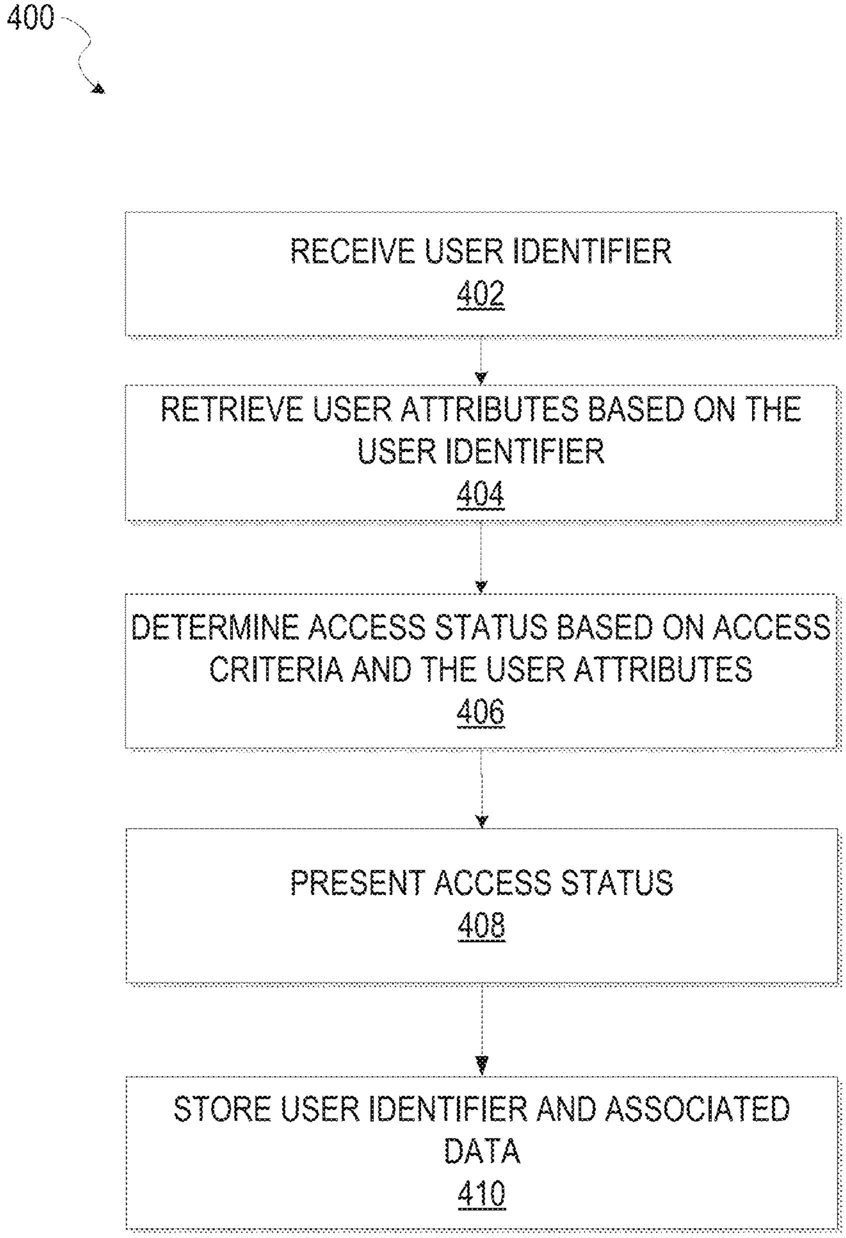
FIG. 4 is a flowchart illustrating a method for receiving a user identifier and determining an access status of the user identifier, according to some embodiments.

FIG. 4 is a flowchart illustrating operations of a method 400 for receiving a user identifier via a data input component (e.g., data input component 106) of the access control device 102, and determining an access status associated with the user identifier based on access criteria (e.g., as discussed with respect to FIG. 3), according to some embodiments.

In operation 402, the data input component 106 of the access control device 102 receives a user identifier. The data input component 106 may include a magnetic strip reader, a bar code reader, a proximity reader, a smart card reader, a biometric reader, or a keypad to enter a personal identification number. The data input component 106 may be configured to receive the user identifier from an identification medium (e.g., a card, RFID) via the data input component 106 or as a user input into a keypad (e.g., a PIN). In operation 404, responsive to receiving the user identifier, the data input component 106 transmits the received user identifier to the access permission engine 112 in order to determine an access status of the user identifier.

At operation 404, the access permission engine 112 determines an access status of the received user identifier based on the access criteria and the user attributes associated with the user identifier. For example, the identification module 113 of the access permission engine 112 receives the user identifier from the data input component 106, and accesses the local data repository 110 to retrieve a set of user attributes associated with the received user identifier. Having received the set of user attributes associated with the user identifier, the identification module 113 routes the retrieved user attributes and user identifier to the access criteria module 114. The access criteria module 114 then compares the received user attributes and user identifier to the access criteria received at operation 306 of FIG. 3. Based on a comparison of access criteria with the received user attributes and user identifiers, the access permission engine 112 determines that the user attributes associated with the user identifier indicate an approved access status.

Responsive to determining the access status based on the access criteria, in operation 408, the alert component 108 of the access control device 102 presents the access status as a sensory alert. In some embodiments, the access status may be presented by illuminating a specific LED indicative of a particular access status (e.g., as depicted in FIG. 2). For example, the portable access control device may include at least two LEDs, as depicted in FIG. 2, such that a first LED indicates an approved access status, while a second LED indicates a denied access status.

In other embodiments, the access control device 102 present the access status by transmitting a notification to a client device via a communication port (e.g., the communication port 104). For example, responsive to determining that a user identifier is approved for access, the portable access control system may transmit a notification to a client device indicating an approved access status.

In other embodiments, the portable access control device may present the access status by emitting a predefined tone via a speaker (e.g., speaker 208) of the access control device 102, wherein a first tone may indicate an approved access status, and a second tone may indicate a denied access status.

At operation 410, having presented the access status, the access control device 102 stores the received user identifier along with associated data within the local data repository 110. For example, the associated data may include data indicating the determined access status, a time and date of receiving the user identifier, and a frequency of the user identifier being received at the access control device 102.

FIG. 5 is a representation of a data-table 500 containing user data, the user data including user identifiers 502 and user attributes 504, according to some embodiments. In some embodiments, the user attributes 504 may be sorted in multiple rows (e.g., row 506) according to their corresponding user identifier (e.g., user identifier 508). The access control device 102 ingests and stores user data within the local data repository 110 in the data-table 500. The data-table 500 may index user attributes according to their corresponding user identifiers, such that referencing a particular user identifier may retrieve a listing of the associated user attributes. For example, user identifier 508 is associated with the user attributes listed within row 506. Thus, by referencing user identifier 508, the access control device 102 may retrieve the corresponding user attributes.

As an illustrative example from a user perspective, suppose a user wishes to allow access to a specified region, only to user identifiers associated with a specific set of user attribute values. The user first uploads user data to an access control device (e.g., access control device 102), wherein the user data includes a list of user identifiers (e.g., a 16-bit user ID), user attributes and user attribute values (e.g., name, employment status, security clearance level, work group ID, etc.). The access control device stores the user data within a local data repository (e.g., local data repository 110), within a data-table (e.g., data-table 500), sorting the user attribute values by their corresponding user identifier and user attribute.

The user next selects access criteria comprising one or more sets of user attribute values required to receive the approved access status. For example, the user may indicate that user identifiers with an associated user attribute value indicating a "high" security clearance receive the approved access status, and all other user attribute values receive a denied access status.

Once the access criteria is defined by the user, the access control device may receive a user identifier via a data input component (e.g., data input component 106). Having received the user identifier, the processors of the access control device may retrieve a set of user attribute values associated with the user identifier, and compare the set of user attribute values against the access criteria. Once the access status of the user identifier has been determined based on the comparison, the access control device presents the access status to the user. For example, a green LED may illuminate if the user identifier is approved for access. In this way, the access control device may receive user identifiers and present access statuses based on the access criteria.

In some example embodiments, the access control device-generates and stores a report including a listing of all collected user identifiers, and one or more user attributes and user attribute values associated with the user identifiers. For example, the access control device may receive a report request from a client device. In response to receiving the report request, the access control device access the local data repository 110 to retrieve the data-table 500 to generate a report to be displayed at the client device. The report generated by the access control device may include a list of names, as well as access status, and employment information of every user identifier which received an approved access status. In further embodiments, the access control device may additionally receive a report content definition that defines one or more fields (e.g., user attributes) to be included in the report. The access control device may then access the data-table 500 to retrieve the relevant fields based on the report content definition.

Example Machine Architecture and Machine-Readable Medium

Figure 6:
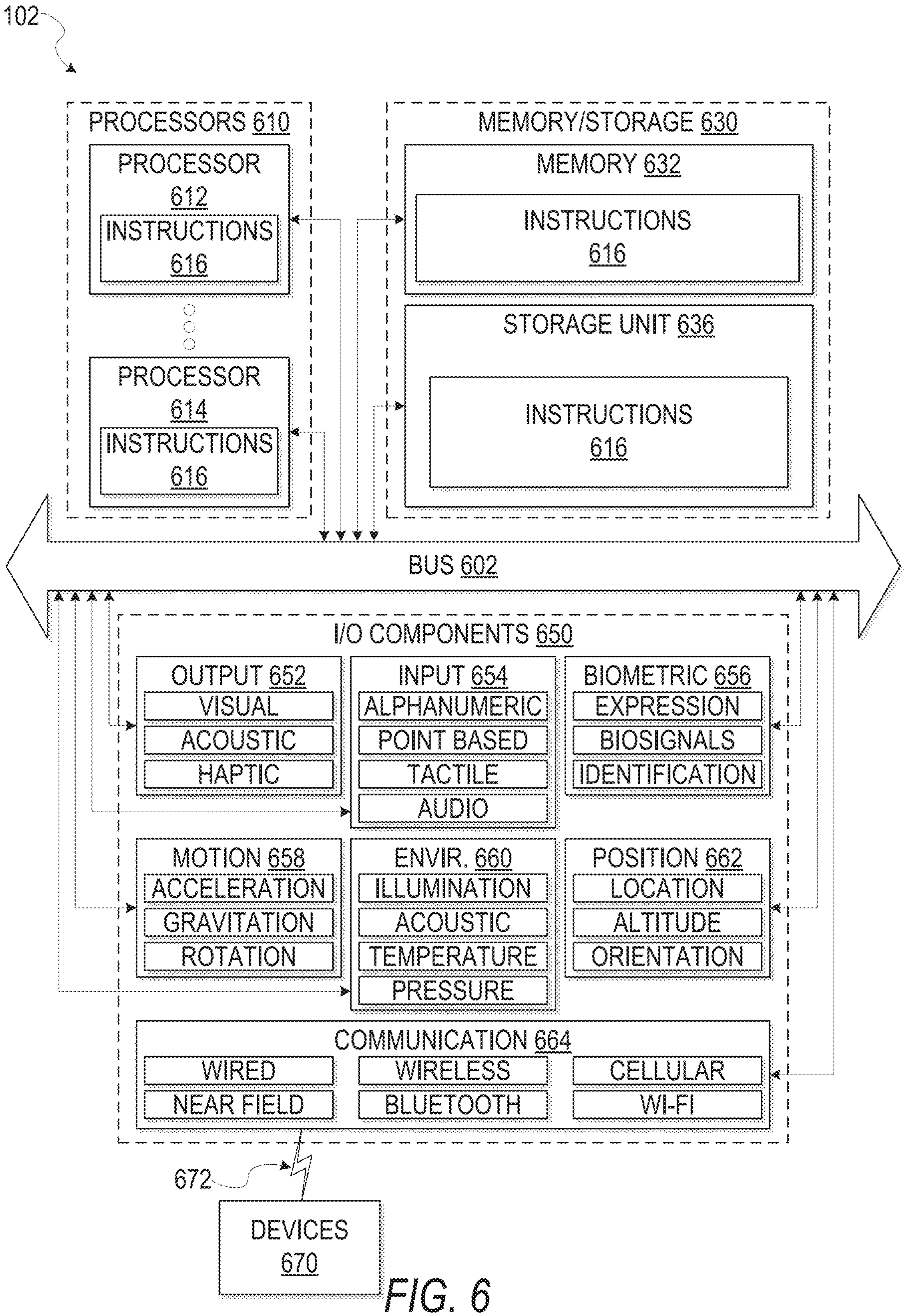
FIG. 6 is a diagrammatic representation of a machine in the example form of a computer system within which a set of instructions for causing the machine to perform any one or more of the methodologies discussed herein may be executed.

FIG. 6 is a block diagram illustrating components of a machine 600 (e.g., access control device 102), according to some example embodiments, able to read instructions from a machine-readable medium (e.g., a machine-readable identification medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory/storage 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 612 and a processor 614 that may execute the instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core processor), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to devices 670 via a coupling 672. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4117, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geo-location, location via Wi-Fi® signal triangulation, location via detecting an NFC beacon signal that may indicate a particular location, and so forth.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A system comprising:

a memory; and at least one hardware processor coupled to the memory and comprising instructions that causes the system to perform operations comprising:

receiving, via a data input component of an access control system, an access request that includes at least a user identifier;

accessing a set of user attributes at a local memory repository of the access control system based on the user identifier in response to the receiving the access request;

determining an access status based on the set of user attributes and an access criteria from the local memory repository of the access control system, the access criteria including at least a selection of a user attribute from among a plurality of user attributes; and presenting the access status.

2. The system of claim 1, wherein the data input component includes one or more of the list comprising:

a magnetic strip reader;

a keypad;

a barcode reader;

a biometric reader; and a proximity card reader.

3. The system of claim 1, wherein the determining the access status based on the set of user attributes includes:

retrieving access criteria associated with the access control system;

performing a comparison of the set of user attributes with the access criteria; and determining that access status based on the comparison.

4. The system of claim 1, wherein the presenting the access status includes:

causing an output component of the access control system to present an indication of the access status.

5. The system of claim 4, wherein the presenting the indication of the access status includes:

emitting an auditory alert that corresponds with the access status.

6. The system of claim 4, wherein the presenting the indication of the access status includes:

presenting a visual indicator that corresponds with the access status.

7. The system of claim 4, wherein the presenting the indication of the access status includes:

transmitting a notification that includes the access status to a client device.

8. The system of claim 1, wherein the access request comprises the user identifier and a timestamp, and the operations further comprise:

generating a report that includes the user identifier, the timestamp, and the access status.

9. A method comprising:

receiving, via a data input component of an access control system, an access request that includes at least a user identifier;

accessing a set of user attributes at a local memory repository of the access control system based on the user identifier in response to the receiving the access request;

determining an access status based on the set of user attributes and an access criteria from the local memory repository of the access control system, the access criteria including at least a selection of a user attribute from among a plurality of user attributes; and presenting the access status.

10. The method of claim 9, wherein the data input component includes one or more of the list comprising:

a magnetic strip reader;

a keypad;

a barcode reader;

a biometric reader; and a proximity card reader.

11. The method of claim 9, wherein the determining the access status based on the set of user attributes includes:

retrieving access criteria associated with the access control system;

performing a comparison of the set of user attributes with the access criteria; and determining that access status based on the comparison.

12. The method of claim 9, wherein the presenting the access status includes:

causing an output component of the access control system to present an indication of the access status.

13. The method of claim 12, wherein the presenting the indication of the access status includes:

emitting an auditory alert that corresponds with the access status.

14. The method of claim 12, wherein the presenting the indication of the access status includes:

presenting a visual indicator that corresponds with the access status.

15. The method of claim 12, wherein the presenting the indication of the access status includes:

transmitting a notification that includes the access status to a client device.

16. The method of claim 9, wherein the access request comprises the user identifier and a timestamp, and the method further comprises:

generating a report that includes the user identifier, the timestamp, and the access status.

17. A non-transitory machine-readable storage medium comprising instructions that, when executed by one or more processors of a machine, cause the machine to perform operations comprising:

receiving, via a data input component of an access control system, an access request that includes at least a user identifier;

accessing a set of user attributes at a local memory repository of the access control system based on the user identifier in response to the receiving the access request;

determining an access status based on the set of user attributes and an access criteria from the local memory repository of the access control system, the access criteria including at least a selection of a user attribute from among a plurality of user attributes; and presenting the access status.

18. The non-transitory machine-readable storage medium of claim 17, wherein the data input component includes one or more of the list comprising:

a magnetic strip reader;

a keypad;

a barcode reader;

a biometric reader; and a proximity card reader.

19. The non-transitory machine-readable storage medium of claim 17, wherein the determining the access status based on the set of user attributes includes:

retrieving access criteria associated with the access control system;

performing a comparison of the set of user attributes with the access criteria; and determining that access status based on the comparison.

20. The non-transitory machine-readable storage medium of claim 17, wherein the presenting the access status includes:

causing an output component of the access control system to present an indication of the access status.

* * * * *